United States Patent [19]

Daly

[11] 4,201,762
[45] May 6, 1980

[54] TRANSPARENT RED IRON OXIDE PIGMENTS AND PROCESS FOR PRODUCING SAME

[75] Inventor: James E. Daly, Hudson Falls, N.Y.

[73] Assignee: Ciba-Geigy Corporation, Ardsley, N.Y.

[21] Appl. No.: 958,078

[22] Filed: Nov. 6, 1978

[51] Int. Cl.$^2$ .......................... C01G 49/06; C09C 1/24
[52] U.S. Cl. ..................................... 423/633; 106/304
[58] Field of Search ................ 423/633; 106/304, 309

[56] References Cited

U.S. PATENT DOCUMENTS

| | | | |
|---|---|---|---|
| 3,471,258 | 10/1969 | Brixner | 423/633 |
| 3,864,463 | 2/1975 | Chao | 423/633 |
| 4,063,957 | 12/1977 | Von Lauff et al. | 106/304 |

FOREIGN PATENT DOCUMENTS 39-19959  9/1964  Japan ........................... 423/633

*Primary Examiner*—Jack Cooper
*Attorney, Agent, or Firm*—Joseph F. DiPrima; Hazel L. Deming

[57] ABSTRACT

Transparent red iron oxide pigments of outstanding quality and particularly high clarity and strength and good dispersibility characteristics are described. The pigments are produced by heating a dry mixture of alpha-ferric oxide hydrate particles and at least 0.2 part per part of hydrate of a salt which is an alkali metal nitrate, nitrite or mixtures thereof to a temperature above the melting point of the salt and recovering the resulting ferric oxide as a pigment.

6 Claims, No Drawings

TRANSPARENT RED IRON OXIDE PIGMENTS AND PROCESS FOR PRODUCING SAME

This invention relates to a process for the preparation of transparent red iron oxide pigments having outstanding strength and clarity and to the pigments so produced.

Iron oxides and their hydrates find extensive use as pigments and can be produced in a variety of colors ranging from yellow through red to brown and black, depending upon composition, crystal structure and size. For instance, alpha-ferric oxide ($\alpha$-$Fe_2O_3$) is red in color, essentially anhydrous and has a rhombohedral crystal structure, whereas alpha-ferric oxide hydrate ($\alpha$-FeOOH or $\alpha$-$Fe_2O_3 \cdot H_2O$) contains 15–20% water, is yellow in color and has an orthorhombic crystal structure.

Red iron oxide pigments are conventionally produced on a commercial scale by dry calcination of the yellow ferric oxide hydrate at elevated temperatures, usually in the range of 300° to 400° C. The attainment of high quality pigments, and particularly pigments exhibiting optimum strength, cleanness, transparency and dispersibility characteristics is difficult to achieve by calcination due to the problems which are inherent to dry heating techniques such as poor heat transfer, under and overheating and sintering of particles. Thus, the next result is at best a compromise which minimizes the detriment to one or more of the desirable properties of the pigment and limits overall acceptability.

One method which has been proposed for avoiding the problems which occur during the dry heating of inorganic pigments and particularly cadmium sulfoselenide, lithopone and titanium dioxide is described by Flasch in U.S. Pat. No. 3,002,846 (Oct. 3, 1961) and concerns subjecting the crude pigment to a heat treatment while suspended in a melt of an alkali metal halide or hydroxide, or mixtures thereof. Flasch's procedure, however, is not suitable for producing red iron oxide pigments from yellow alpha-ferric oxide hydrate because the hydrate cannot be heated to temperatures above about 400° C. without detriment to optical properties and the presence of halide, and specifically chloride ions, or hydroxyl ions adversely affects and prevents development of a product of pigmentary value.

Now, in accordance with the present invention, it has been found that not only can the problems which are normally associated with dry calcination be avoided, but that transparent red iron oxide pigments of outstanding quality, and particularly high clarity and strength and good dispersibility characteristics, can be produced by heat treating alpha-ferric oxide hydrate in a melt of an alkali metal nitrate or nitrite. Accordingly, the present invention relates to a process for producing transparent red iron oxide pigments having improved optical qualities comprising forming a dry mixture of particles alpha-ferric oxide hydrate and at least 0.2 part per part of hydrate of at least one salt selected from the group consisting of alkali metal nitrates and nitrites, heating the mixture to a temperature above the melting point but below the decomposition temperature of said salt until the desired red shade of ferric oxide is obtained, separating the ferric oxide from the salt, and recovering the separated oxide as a pigment, and to transparent red iron oxide pigments so produced.

The starting ferric oxide which is used to form the red colored pigments of this invention is, as stated, alpha-ferric oxide hydrate. The hydrates include the natural or synthetic goethites; the alpha-monohydrate $Fe_2O_3 \cdot H_2O$ (the polymorphoic form obtained from ferric chloride); the limonites, $2Fe_2O_3 \cdot 3H_2O$, which are generally composed of goethite; ferric hydroxide $Fe(OH)_3$; and the synthetic yellow pigment which is essentially alpha-FeOOH. Syntheses of such compounds are well known and typically involve precipitation of the ferric compound in the desired form from a solution of a soluble ferric salt such as the sulfate, nitrate or chloride using as precipitant an alkali such as sodium hydroxide, potassium hydroxide, ammonium hydroxide, sodium carbonate and the like. If desired, the iron compound can be precipitated in its ferrous form and then oxidized to the ferric state with gaseous or solid oxidizing agents. The hydrates are used in particulate form and preferably the particles will be acicular in shape. Particularly preferred are the acicular particles which have a length of 0.03 to 0.2 micron and a length:width ratio of at least 3:1, and most preferably a length of 0.05 to 0.10 micron and a length:width ratio from 5:1 to 10:1.

In carrying out the process of the present invention, a dry mixture of the particulate alpha-ferric oxide hydrate and at least 0.2 part per part of hydrate of the alkali metal nitrate or nitrite is formed and the mixture is heated to a temperature which is above the melting point but below the decomposition point of the alkali metal nitrate or nitrite. The mixture is formed conventionally using any known technique for mixing two or more solids. The alkali metal nitrate or nitrite can be in the form of moderate-size crystals or pellets, but is preferably in powder form to facilitate formation of a uniform mixture in short periods of time. The preferred salts are anhydrous and the alkali metal component of the nitrate or nitrite is preferably sodium, potassium or lithium. The amount of salt used should be at least 0.2 part per part of hydrate in order to realize the advantages of this invention and usually will range from about 0.5 part to about 3 parts per part of the hydrate.

The heating step is carried out in conventional apparatus such as a furnace or oven at a temperature at which the salt is molten. Depending, of course, upon the particular alkali metal component of the salt, the temperature will usually range from about 310° to about 380° C. when the salt is a nitrate and from about 270° C. to about 320° C. when the salt is a nitrite. The time of heating under molten conditions can vary from about 5 minutes to 3 hours or more, depending upon the particular salt, the temperature and the shade of redness desired. Usually, and such is preferred, the mixture is heated slowly over a period of about one hour to the desired temperature and the heating is continued for 15 minutes to 2 hours.

Following heating of the mixture to the desired red iron oxide, the iron oxide is separated from the salt conventionally, usually by dumping into water, stirring, if necessary, to dissolve the salt and then filtering, pressing out, or decanting to separate the solid from the liquid. The separated solids can then be washed with fresh water to remove residual salts. Drying can be accomplished by conventional means such as tray dryers, vacuum dryers, spray dryers, and the like, and the dried product is usually pulverized as by grinding in a hammer-mill.

The invention is further illustrated by reference to the following examples wherein all parts and percentages are by weight unless otherwise indicated.

EXAMPLE 1

A charge of a dry blend containing 35 parts of regular shade transparent yellow iron oxide powder (alpha-ferric oxide hydrate particles having an average length of 0.07 micron and a length to width ratio of 7:1) and 100 parts of powdered sodium nitrate was transferred to an open porcelain vessel and the vessel was placed in an electric furnace at 370° C. The charge was heated at 370° C. for 90 minutes following which time the molten charge was dumped into 500 parts of water at 60° C. The resulting red slurry was agitated to dissolve the sodium nitrate and the slurry was filtered to recover the red iron oxide. The product, following washing, drying and grinding was a transparent red iron oxide pigment of exceptional cleanness, brightness and intensity.

The pigmentary product of this example was evaluated in an automotive paint formulation by dispersing 20.2 parts of pigment in 84.5 parts of a commercial thermosetting acrylic lacquer, mixing the lacquer dispersion with sufficient of an aluminum flake paint to provide a pigment:aluminum flake weight ratio of 85:15 and then spraying the resulting paint onto aluminum panels. The coated panels were evaluated for color, cleanness, brightness and optical properties by visual examination at various angles of reflected light and compared with panels coated with paints from a control pigment prepared in the manner of this example except that no sodium nitrate was present during the heating step (Control A) and with a control pigment prepared in the manner of this example except that 100 parts of sodium hydroxide were substituted for the sodium nitrate (Control B). The results of these evaluations are reported in the Table below.

EXAMPLE 2

The procedure of Example 1 was repeated except that the ferric oxide hydrate used was a green shade yellow hydrate having an average particle length of 0.05 micron and a length:width ratio of 5:1. The product of this example was a very clean, transparent red iron oxide pigment having essentially the same properties as the pigment of Example 1 (See the Table, below).

EXAMPLE 3

The procedure of Example 1 was repeated except that 70 parts of the hydrate and 70 parts of sodium nitrate were used. The product of this example was a transparent red iron oxide pigment of exceptional cleanness, brightness and intensity.

When the above procedure was repeated except that 90 parts of the hydrate of Example 1 and 10 parts of sodium nitrate were used, the product (Control C) was weaker and had poorer optical properties than the pigment of this example.

The results of the evaluation of the products of this example and control C are reported in the Table, below.

EXAMPLE 4

The procedure of Example 2 was repeated except that 70 parts of the hydrate and 70 parts of sodium nitrate were used. The product of this example was a very clean, transparent red iron oxide pigment having exceptional cleanness, brightness and intensity. The results of the evaluation of the pigment of this example are reported in the Table, below.

EXAMPLE 5

The procedure of Example 1 was repeated except that sodium nitrate was substituted for the sodium nitrate and the heating was carried out at 316° C. for 90 minutes. The product of this example was a transparent red iron oxide pigment of extraordinary cleanness and intensity as compared with a control pigment (Control D) prepared in the manner of this example except that no sodium nitrate was present during the heating step. The results of the evaluation of the pigment of this example and Control D are reported in the Table, below.

Table I

| Pigment | Color | Shade Depth | Cleanness | Strength | Face[2] | Flop[2] |
|---|---|---|---|---|---|---|
| Ex. 1 | Red | 110 | 120 | 110 | 120 | 100 |
| Control A | Red | 100 | 100 | 100 | 100 | 100 |
| Control B | Brown | <1 | <1 | 10 | <1 | <1 |
| Ex. 2 | Red | 110 | 120 | 110 | 120 | 100 |
| Ex. 3 | Red | 110 | 120 | 110 | 120 | 120 |
| Control C | Red | 100 | 100 | 100 | 100 | 100 |
| Ex. 4 | Red | 110 | 120 | 110 | 120 | 120 |
| Ex. 5 | Red | 120 | 130 | 120 | 130 | 90 |
| Control D | Red | 100 | 100 | 100 | 100 | 100 |

Panel Evaluation[1]

[1] The numerical values are in percent, using the present industry standard of acceptance as 100 percent.
[2] The terms "Face" and "Flop" as used herein refer to trade designations conventionally used to describe the aesthetic value of a metallic automotive finish. In this evaluation "Face" is a measure of the true chroma value of the pigment and is determined by placing the panel in a horizontal plane and viewing the panel from a positon perpendicular to its face. "Flop" is a measure of the change in hue normally associated with a change in viewing angle and is determined by altering the orientation of the panel by gradually turning the plane of the panel from the "Face" viewing position toward a viewing position parallel to the panel's face.

What I claim and desire to protect by Letters Patent is:

1. A process for producing transparent red iron oxide pigments having improved optical qualities comprising forming a dry mixture of particulate alpha-ferric oxide hydrate and at least 0.2 part per part of hydrate of at least one salt selected from the group consisting of alkali metal nitrates and nitrites, heating the mixture to a temperature above the melting point but below the decomposition temperature of said salt until the desired red shade of ferric oxide is obtained, separating the ferric oxide from the salt in water whereby the salt is dissolved, and recovering the separated oxide as a pigment.

2. The process of claim 1 wherein the particulate ferric oxide hydrate is acicular particles having an average particle length of 0.03 to 0.2 micron and a length:-width ratio of at least 3:1.

3. The process of claim 2 wherein the amount of salt ranges from 0.5 part to 3 parts per part of hydrate.

4. The process of claim 3 wherein the ferric oxide is transparent yellow alpha-FeOOH.

5. The process of claim 4 wherein the salt is sodium nitrite.

6. The process of claim 4 wherein the salt is sodium nitrate.

* * * * *